United States Patent Office 3,383,282
Patented May 14, 1968

3,383,282
7α-METHYL-3,5-ANDROSTADIENE-3,17-DIOLS AND PHARMACEUTICALLY ACTIVE COMPOSITIONS THEREOF
J Allan Campbell and John C. Babcock, Kalamazoo, Mich., assignors to The Upjohn Company, Kalamazoo, Mich., a corporation of Delaware
No Drawing. Filed Apr. 7, 1965, Ser. No. 446,419
14 Claims. (Cl. 167—65)

ABSTRACT OF THE DISCLOSURE

This invention relates to novel steroids, more particularly to the 3-enol acylates, 3,17-dienol diacylates and 3-enol ethers of certain 7α-methyl-4-androstenes, 2α,7α-dimethyl-4-androstenes and their 19-nor-counterparts of the formula

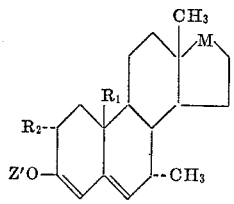

wherein $R_1$ and $R_2$ are selected from the group consisting of hydrogen and methyl; $Z'$ is selected from the group consisting of lower alkyl of from one to twelve carbon atoms, inclusive, and the lower acyl radical of a hydrocarbon carboxylic acid containing from one to twelve carbon atoms, inclusive; M is selected from the group consisting of

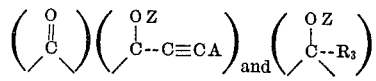

wherein A is selected from the group consisting of hydrogen, lower-alkyl of from one to twelve carbon atoms, inclusive, chlorine, bromine and trifluoromethyl, $R_3$ is selected from the group consisting of hydrogen, lower alkyl of from one to twelve carbon atoms, inclusive, and Z is selected from the group consisting of hydrogen and the lower acyl radical of a hydrocarbon carboxylic acid containing from one to twelve carbon atoms, inclusive.

The compounds of the present invention and the processes for their production are illustratively represented by the following sequence of formulae:

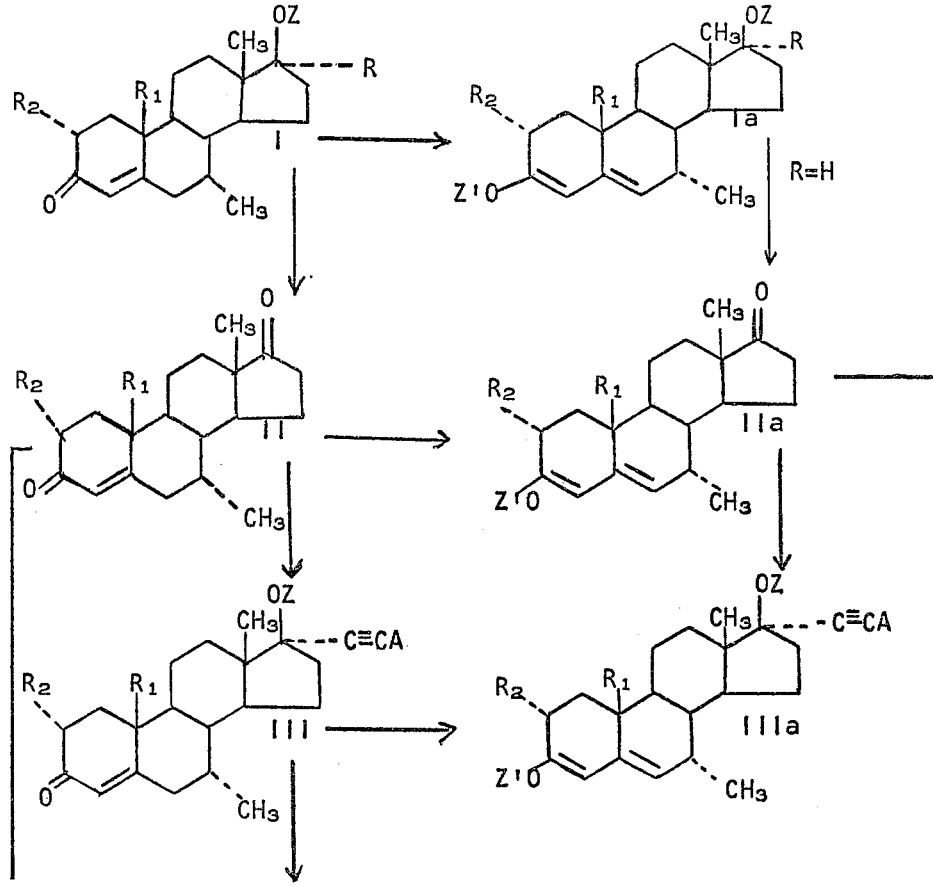

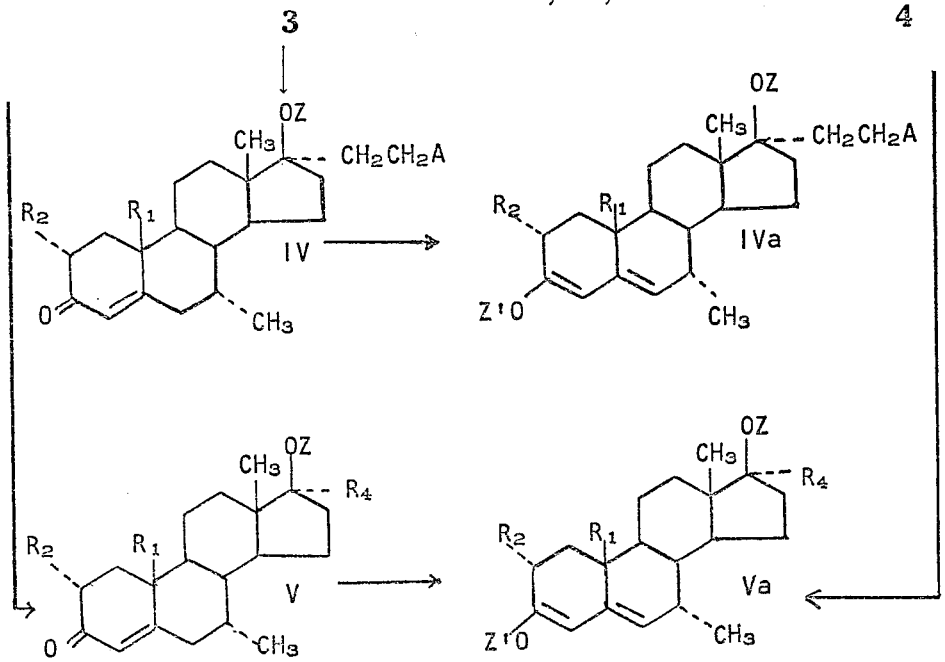

wherein $R_1$, $R_2$, $Z$, $C'$ and $A$ have the same meaning as above; $R$ has the same meaning as $R_1$; $R_4$ is a lower alkyl radical containing from one to twelve carbon atoms, inclusive.

The 3-enol acylates (of Formulae I$a$, III$a$, IV$a$ and V$a$) and 3-enol ethers (of Formulae I$a$, II$a$, III$a$, IV$a$ and V$a$) of the invention are prepared from the known 7α-methyl-4-androstene starting materials of Formula I of the flow-sheet, above, which are synthesized in the manner of Campbell and Babcock (J. Amer. Chem. Soc. 81, 4069). The corresponding 2α,7α-dimethyl compounds (I) are produced in accordance with the procedures of U.S. Patent 2,923,720.

Oxidation of the compounds of Formula I, e.g., 7α-methyl-19-nor-17β-hydroxy-4-androstene-3-one (I) and 2α,7α-dimethyl-17β-hydroxy-4-androstene-3-one (I), with oxidizing agents such as chromic acid, sodium dichromate, potassium dichromate, and the like, using procedures known in the art, yields 7α-methyl-19-nor-4-androstene-17-one (II) and 2α,7α-dimethyl-4-androstene-3,17-dione (I).

The 7α-methyl (and 2α,7α-dimethyl)-3,17-diketo-4-androstenes and 19-nor-androstenes of Formula II, prior to the formation of their corresponding 17α-alkynyl and haloalkynyl derivatives (III) and 17 alkyl derivatives (V), must first be converted to the corresponding 3-enamines, 3-ketals, or 3-enol ethers in order to protect the 3-keto function from reduction. The 3-enamine formation can be accomplished in the manner described in U.S. Patent 2,781,343, namely, by reaction with a secondary cyclic alkyleneamine containing from 5 to 7 ring atoms, inclusive, such as pyrrolidine, piperidine, morpholine, and C-alkyl substituted pyrrolidines, piperidines, and morpholines such as 2,4-dimethylpyrrolidine, 3-propylpiperidine, 2-methylpyrrolidine, 3,4 - dimethyl-pyrrolidine, 3-ethylpyrrolidine, 3-isopropylpyrrolidine, 3,3-dimethylpyrrolidine, 2-methylmorpholine, 3-methylmorpholine, and the like. Pyrrolidine is the preferred amine for use in the above reaction.

Advantageously, the 3-enamine is prepared by mixing the 7α-methyl (and 2α,7α-dimethyl) - 4 - androstene-3, 17-diones (II) and the secondary cyclic alkyleneamine together in the presence of a suitable solvent, for example, a lower alkanol such as methanol, ethanol, and the like. The desired 3-enamine generally separates from the reaction mixture and is isolated and dried for a short period before being used without further purification in the next stage of the synthesis.

The 3-enamines of 7α-methyl (and 2α,7α-dimethyl)- 4-androstene-3,17-diones (II) so obtained are then reacted with an organo-alkali metal derivative, for example, the sodium or potassium derivative of the appropriate alkyne. The reaction is carried out preferably in the presence of an anhydrous inert solvent such as dimethylformamide, dimethylsulfoxide, and the like. The 3-enamines of the 7α-methyl (and 2α,7α-dimethyl) - 17α - alkynyltestosterones (III) so obtained are not generally isolated from the reaction mixture but are hydrolyzed in situ to the free 7α-methyl (and 2α,7α-dimethyl) - 17α - alkynyltestosterones (III) by treatment with an aqueous solution of a base such as sodium hydroxide, potassium hydroxide, and the like, after first decomposing the reaction mixture with water, ammonium chloride, and the like.

The 7α - methyl (and 2α,7α-dimethyl) - 17α - alkynyltestosterones (IV) so obtained can be purified, if desired, by procedures known in the art such as by recrystallization, chromatography, and the like.

The 7α - methyl (and 2α,7α-dimethyl)-17α-alkynyltestosterones (III) can also be prepared by reacting the 3-enamines of the 7α - methyl (and 2α,7α - dimethyl)-4-androstene-3,17-diones (II), prepared as described above, with the appropriate alkynyl magnesium halide. The reaction is preferably carried out in the presence of a solvent such as diethyl ether, tetrahydrofuran, and the like. Preferably, the Grignard reagent is employed in an excess of the order of 10 moles per mole of the 3-enamine. The 3-enamines of 7α-methyl (and 2α,7α-dimethyl) - 17α-alknyltestosterone (III) so obtained are generally not isolated from the reaction mixture but are hydrolyzed in situ to the free 7α-methyl (and 2α,7α-dimethyl) - 17α - alkynyltestosterones (III) by the method described above.

In converting the 7α-methyl (and 2α,7α-dimethyl)-3, 17 - diketo-4-androstenes (II) to their corresponding 17α-alkynyl and haloalkynyl derivatives (III), 3-keto protecting groups in addition to the 3-enamines described above, such as 3-ketals and 3-enol ethers, can be employed. Treatment of a 3-ketal or 3-enol ether of a compound of Formula II with an alkali metal derivative, e.g., an appropriate alkyne or haloalkyne, yields the corresponding 3-ketone of Formula III. Methods for the preparation of 3-ketals and 3-enol ethers of a variety of 3-keto compounds of the androstane series, and their subsequent alkynylation or haloalkynylation, are described in detail in J. Chem. Soc., 4995 (1962).

The alkynyl compounds of Formula III can be readily reduced at the 17α-position (e.g., with hydrogen in the presence of a palladium catalyst) to give selectively the corresponding side-chain saturated compound (IV). For example by employing the foregoing procedure, 7α-methyl-19-nor-17β-hydroxy-17α-ethynyl-4-androsten-3-one (III) is converted to 7α-methyl-19-nor-17β-hydroxy-17α-ethyl-4-androsten-3-one (IV).

The 17-ketones represented by Formula II can be converted to the corresponding 17β-hydroxy-17α-alkyl derivatives (V) by treatment with an appropriate alkylating agent such as an appropriate Grignard reagent or alkyl lithium compound. Before converting the compounds of Formula II to the 17α-alkyl compounds (V) by the above procedure, however, it is necessary to first attach a protecting group at the 3-position, e.g., an enamine; this can be carried out in the manner described hereinbefore for preparing the 17α-alkynyl compounds (III) from the corresponding 17-ketones (II). The 17α-alkylated-3-enamine produced by the reaction of an appropriate alkylating agent (e.g., a Grignard reagent or alkyl lithium) with a 3-enamine of a compound of Formula II is generally not isolated from the reaction mixture, but is hydrolyzed in situ to the corresponding 7α-methyl (or 2α,7α-dimethyl)-17α-alkyl derivative (V) by treatment with an aqueous solution of a base such as sodium hydroxide, potassium hydroxide, etc., after first decomposing the reaction mixture with water, ammonium chloride, and the like. By following the foregoing procedure, 2α,7α-dimethyl-4-androstene-3,17-dione 3-pyrrolidinyl enamine (II) is converted to 2α,7α,17α-trimethyl-17β-hydroxy-4-androsten-3-one (V).

The Δ⁴-3-ketones represented by Formulae I, II, III, IV, and V of the flow-sheet, above, are readily converted to the corresponding 3,17-dienol diacylates of Formulae Ia, IIa, IIIa, IVa and Va, respectively. This conversion is a well known reaction. Treating the Δ⁴-3-ketone with an anhydride, a chloride, or bromide of an organic carboxylic acid, preferably a hydrocarbon carboxylic acid containing from one to twelve carbon atoms, inclusive, in the presence of an acid catalyst such as paratoluenesulfonic acid, perchloric acid, sulfuric acid, and the like, or with an isopropenyl acylate wherein the acyl group is that of a hydrocarbon carboxylic acid is defined above, yields the corresponding 3-acyloxy-3,5-diene and the 3,17-diacyloxy-3,5-16-triene. The reaction is usually carried out at the refluxing temperature of the reaction mixture, e.g., between about 30° C. to about 150° C. An excess of acylating agent, two to twenty moles per mole of Δ⁴-3-ketone, is usually employed. Aromatic hydrocarbons, e.g., benzene or toluene, methylene chloride, chloroform, and carbon tetrachloride are convenient solvents for the acylation reaction. The 3-monoacylate and 3,17-diacylate products can be isolated by removing the solvents, by evaporation under diminished pressure or atmospheric pressure (preferably, in an atmosphere of nitrogen), and washing the products with water to remove the catalyst. Alternatively, excess acylating agent can be destroyed by addition of water or an alkanol and the products then isolated by extraction or by precipitation with a large quantity of water.

The 3,5-androstadiene 3-monoacylates and 19-nor derivatives thereof embraced by Formulae Ia, IIa, IIIa, IVa and Va of the flow-sheet, above, can also be conveniently prepared in accordance with the following reaction:

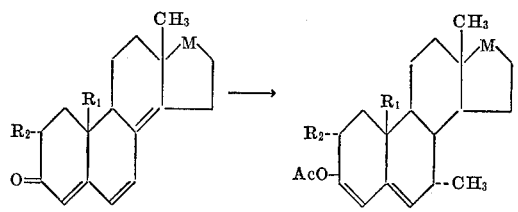

wherein Ac is the acyl radical of a hydrocarbon carboxylic acid containing from one to twelve carbon atoms, inclusive, R₁, R₂, A, Z and M have the same meaning as on columns 1, 2 and 3, 4, except that in the second value indicated thereat for M, R₃ is other than hydrogen. The 6-dehydrotestosterone starting materials (prepared as in U.S. Patent 2,739,974 or by the reaction of testosterones with chloranil) are reacted with an excess e.g., 1.1 to 10 moles of a Grignard reagent, e.g., methyl magnesium iodide, methyl magnesium bromide and the like, in the presence of cuprous chloride or an equivalent catalyst, cuprous chloride being preferred. An anhydride of a hydrocarbon carboxylic acid in a solvent (preferably tetrahydrofuran) is added and the reaction mixture agitated at or near room temperature, preferably for several hours. Various inert solvents can be employed in carrying out the reaction, e.g., benzene, toluene, ethylene glycol dimethyl ether and tetrahydrofuran, the lattermost being preferred. The 3,5-androstadiene and norandrostadiene 3-monoacylate products are isolated by decomposing the excess anhydride, removing the solvents and catalysts by standard procedures well known in the steroid art. The whole operation is carried out with exclusion of oxygen, by treating the reactants in an atmosphere of nitrogen and by purging (with nitrogen) the solvents employed in extraction of the products as well as the resulting extracts. The crude 3-monoacylates are purified by chromatography, recrystallization or other commonly used known methods.

The Δ⁴-3-keto compounds embraced by Formulae I, II, III, IV and V are converted to their corresponding 3-enol ethers represented by Formula Ia, IIa, IIIa, IVa and Va, respectively, by known methods, e.g., by reaction with a trialkyl orthoformate in the presence of a catalyst such as paratoluenesulfonic acid, hydrochloric acid, and the like, in accordance with known procedures, e.g., those described in Ber., 71, 1766.

The compounds of Formulae Ia through Va of the present invention have anabolic and androgenic activity of improved therapeutic ratio of the former versus the latter. They also exhibit improved solubility properties in oil vehicles, e.g., sesame oil, cottonseed oil and the like suitable for intra muscular injection, thus permitting more effective doses of steroid to be administered in a practical volume of oil and prolonging the duration of biological effect. They also possess erythropoietic, anti-fertility, anti-androgenic and anti-estrogenic activities. They also have the ability to reduce the level of cholesterol in the blood and disease blood clotlysis time and consequently are of value in the treatment or prevention of atherosclerosis and thromboembolic disorders. The foregoing properties make the new compounds useful in medical and veterinary practice.

The compounds of the invention can be prepared and administered to mammals, birds, humans, and animals, in a wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

*Example 1.—2α,7α-dimethyl-17β-hydroxy-4-androstene-3-one (2α,7α-dimethyltestosterone) (I)*

A solution of 9.96 g. (0.331 mole) of 7α-methyl-17β-hydroxy-4-androstene-3-one (7α-methyltestosterone) (I) (prepared in the manner disclosed in J. Amer. Chem. Soc., 81, 4069) in 150 ml. of 5-butyl alcohol was treated with stirring at about 60° C. with 10 ml. of ethyl oxalate followed by 13 ml. of 25 percent sodium methoxide solution. Heating was stopped and stirring continued for about 20 minutes, while the temperature of the reaction mixture was allowed to decline without external cooling. After the addition of about 120 ml. of anhydrous ether and a further period of about 20 minutes of stirring, the yellow glyoxalate was collected by filtration, washed with ether and dried at about 70° C. in vacuo. The crude glyoxalate weighing 9.17 g was mixed with 30 g. of potassium carbonate, 30 ml. of methyl iodide and 250 ml. of acetone; the mixture was stirred while heating under gentle reflux for a period of about 24 hours. The reflux condenser was removed and the reaction flask arranged for distillation. After between about 75 and 100 ml. had distilled, the reaction mixture was filtered and the filtrate evaporated to dryness to give 10 g. of solid. This material was dissolved in 125 ml. of methanol, purged with nitrogen and treated with 10 ml. of similarly purged 25 percent sodium methoxide solution. After about 2 hours at room temperature, 250 ml. of saturated salt solution was added, the mixture extracted with methylene chloride, dried and evaporated to an amber gum. This crude product was purified by chromatography on 350 g. of Florisil (synthetic magnesium silicate). Thirty-five fractions of 550 ml. volume were collected using a gradient from 100 percent Skellysolve B (hexane hydrocarbons) to 10 percent Skellysolve B (hexane hydrocarbons) to 10 percent acetone-90 percent Skellysolve B. Fractions 18 to 28 contained 2.68 g. of crystals which after two recrystallizations from a mixture of acetone and Skellysolve B gave pure $2\alpha,7\alpha$-dimethyl-$17\beta$-hydroxy-4-androstene-3-one (I), melting at 170 to 180° C.;

$\lambda_{max.}^{alc.}$ 214 m$\mu$; $\epsilon = 15,560$; $\nu_{max.}^{Nujol}$ 3,450, 1,655, 1,622, 1,225 and 1,075 cm.$^{-1}$

*Analysis.*—Calcd. for $C_{21}H_{32}O_2$: C, 79.70; H, 10.19. Found: C, 79.59; H, 10.49.

Following the procedure of Example 1, but substituting for the starting steroid $7\alpha$-methyl-$17\beta$-hydroxy-4-androsten-3-one (I), the following representative starting material $7\alpha$ - methyl-19-nor-$17\beta$-hydroxy-4-androstene-3-one (I), yields $2\alpha,7\alpha$-dimethyl-19-nor-$17\beta$-hydroxy-4-androsten-3-one (I).

*Example 2.*—$2\alpha,7\alpha,17\alpha$-trimethyl-$17\beta$-hydroxy-4-androsten-3-one ($2\alpha,7\alpha,17\alpha$-trimethyltestosterone) (I)

To a solution of 50 g. of $7\alpha,17\alpha$-dimethyl-$17\beta$-hydroxy-4-androsten - 3 - one ($7\alpha,17\alpha$ - dimethytestosterone) (I) (prepared as in J. Amer. Chem. Soc. 81, 4069) in 750 ml. of t-butyl alcohol, warmed to 55° C. in a nitrogen atmosphere, 50 ml. of ethyl oxalate and 65 ml. of 25 percent sodium methoxide solution was added with stirring. Stirring was continued for about 20 minutes after which 750 ml. of ether was added. The mixture was filtered and the solid of yellow glyoxalate dried under nitrogen in a vacuum oven to give 46 g. of crude material. A mixture of the crude glyoxalate, 150 g. of potassium carbonate, 150 ml. of methyl iodide and 1250 ml. of acetone was stirred and heated under reflux for about 24 hours. Approximately 500 ml. of liquid was distilled off and the remaining mixture filtered. The filter cake was washed with acetone and the combined mixture filtered. The cake was washed with additional acetone and the combined filtrate evaporated at reduced pressure to an amber gum which was dissolved in 625 ml. of methanol purged with nitrogen and treated with 50 ml. of 25 percent sodium methoxide solution. After about 2 hours, 1400 ml. of saturated sodium chloride solution was added, and the mixture extracted with methylene chloride. The extract was dried and the solvent evaporated. The crude gummy product was purified via chromatography on a 2.5 kg. column of Florisil. A mixture composed of 6 percent of acetone and the remainder. Skellysolve B eluted 13.34 g. of crystals, which on recrystallization from acetone-Skellysolve B yielded 11.53 g. of the desired product (I) melting at 158 to 159° C. A portion of this material was recrystallized from the same solvent pair to provide an analytical sample of pure $1\alpha,7\alpha,17\alpha$-trimethyl-$17\beta$-hydroxy-4-androstene-3-one (I) melting at 158 to 159° C.;

$\lambda_{max.}^{alc.}$ 242 m$\mu$; $\epsilon = 15,500$; $\nu_{max.}^{Nujol}$ 3435, 1665, 1622, 1220, 1166, 1075 cm.$^{-1}$ (index I-10,881)

Depression of the melting point of the product (I wherein $R_2 = CH_3$) occurred on mixture with the starting material (I wherein $R_2 = H$).

*Analysis.*—Calcd. for $C_{22}H_{34}O_2$: C, 79.95; H, 10.37. Found: C, 79.60; H, 10.48.

Following the procedure of Example 2, but substituting for the starting steroid $7\alpha,17\alpha$-dimethyl-$17\beta$-hydroxy-4-androsten-3-one (I), the following representative starting materials, $7\alpha,17\alpha$ - dimethyl - 19 - nor - $17\beta$ - hydroxy - 4-androsten-3-one (I), yields $2\alpha,7\alpha,17\alpha$-trimethyl-19-nor-$17\beta$-hydroxy-4-androsten-3-one (I).

*Example 3.*—$7\alpha,17\alpha$-dimethyl-$17\beta$-hydroxy-4-androsten-3-one 17-acetate (I)

A solution of 10 g. of $7\alpha,17\alpha$-dimethyl-$17\beta$-hydroxy-4-androsten-3-one (I) in 20 ml. of acetic anhydride and 50 ml. of pyridine was refluxed under nitrogen for about 16 hours. The solvent was removed on a rotary evaporator leaving a brown crystalline residue. It was triturated with Skellysolve B, the crystals washed with Skellysolve B and methanol, and recrystallized from acetone-Skellysolve B to give 5 g. of product melting at 187 to 191° C. Part of the product was recrystallized from acetone-Skellysolve B to give an analytical sample of $7\alpha,17\alpha$-dimethyl-$17\beta$-hydroxy-4-androsten-3-one 17-acetate (I); melting point 190 to 192° C.;

$\lambda_{max.}^{alc.}$ 242 m$\mu$ ($\epsilon = 16,750$); $[\alpha]_D + 90°$ (chloroform)

*Analysis.*—Calcd. for $C_{23}H_{34}O_3$: C, 77.05; H, 9.56. Found: C, 76.85; H, 9.68.

Following the procedure of Example 3 but substituting $2\alpha,7\alpha$-dimethyl-$17\beta$-hydroxy-4-androsten - 3 - one (I) and $2\alpha,7\alpha,17\alpha$ - trimethyl-$17\beta$-hydroxy-4-androsten - 3 - one as starting materials, yields the corresponding 17-acetates (I).

*Example 4.*—$2\alpha,7\alpha$,-dimethyl-$17\beta$-hydroxy-4-androsten-3-one 17-acetate ($2\alpha,7\alpha$-dimethyltestosterone 17-acetate) (I)

(a) A solution of 1 g. of $2\alpha,7\alpha$-dimethyl-$17\beta$-hydroxy-4-androsten-3-one (I), dissolved in 6 ml. of dried and redistilled pyridine, is treated with 6 ml. of acetic anhydride. After standing at room temperature for about 17 hours, the reaction mixture is poured into ice water. The mixture is filtered after about two hours of standing and the precipitate washed with water and dried in vacuo. Upon recrystallization from a mixture of acetone and hexane, pure $2\alpha,7\alpha$-dimethyl-$17\beta$-hydroxy-4-androsten-3-one 17-acetate (I) is obtained.

$2\alpha,7\alpha,17\alpha$ - trimethyl-$17\beta$-hydroxy-4-androsten-3-one 17-benzoate ($2\alpha,7\alpha,17\alpha$-trimethyltestosterone 17-benzoate) (I)

(b) A suspension of 0.3 g. of $2\alpha,7\alpha,17\alpha$-trimethyl-$17\beta$-hydroxy-4-androsten-3-one (I) in 12 ml. of benzene is treated with 0.3 ml. of distilled benzoyl chloride and 0.3 ml. of dry pyridine. The mixture is stirred for about 17 hours at room temperature. After washing with aqueous dicarbonate and drying, the solution is chromatographed over Florisil. The fractions containing benzoate ester by ultraviolet examination are combined and recrystallized from ethyl acetate and hexane to give pure $2\alpha,7\alpha,17\alpha$-trimethyl-$17\beta$-hydroxy-4-androsten - 3 - one 17 - benzoate (I).

In the same manner as given in Example 4 (*a* and *b*), the $17\beta$-cyclopentylpropionate, formate, butyrate, isobutyrate, valerate, isovalerate, hexanoate, octanoate, phenylacetate and other like 17-esters of $2\alpha,7\alpha$-dimethyl and $2\alpha,7\alpha,17\alpha$-trimethyltestosterone (I) are prepared by the reaction of their corresponding $17\beta$ alcohols with the appropriate acid anhydride or halide.

Similarly, following the procedures of Example 4 (*a* and *b*) and the paragraph directly above, the following representative 17β-hydroxy compounds are converted to a desired 17-ester named therein:

(1) 2α,7α-dimethyl-19-nor-17β - hydroxy - 17α-ethynyl-4-androsten-3-one (I) and
(2) 2α,7α,17α-trimethyl-19-nor-17β-hydroxy-4-androsten-3-one (I).

*Example 5.—7α-methyl-19-nor-17β-hydroxy-17α-ethynyl-4-androsten-3-one* (III)

(a) 7α-methyl-19-nor - 4 - androstene-3,17-dione-3-pyrrolidinyl enamine.

To a solution of 10 mg. of 7α-methyl-19-nor-4-androsten-3,17-dione (II) (prepared as in Belgian Patent 610,385) in a small volume of boiling methanol, several drops of pyrrolidine were added. The resulting solution was concentrated by evaporation and allowed to cool. The crystalline solid which separated was isolated by filtration, washed with a small volume of methanol and dried. There was thus obtained 7α-methyl-19-nor-4-androsten-3,17-dione 3-pyrrolidinyl enamine in the form of crystalline solid melting at 151 to 160° C. The intraviolet absorption spectrum of the compound (in ether solution) exhibited a maximum at 282 mμ ($\epsilon$=23,450). The infrared absorption spectrum (in a mineral oil mull) and 1935 cm.$^{-1}$.

(b) 7α-methyl-19-nor-17β - hydroxy-17α-ethynyl-4-androsten-3-one (III)

A volume of 1 ml. of a 20 percent by weight suspension of sodium acetylide in xylene was centrifuged and the solid that separated was taken up in 6 ml. of redistilled dimethyl sulfoxide. To the resulting mixture was added the 3-pyrrolidinyl enamine from 0.5 g. of 7α-methyl-19-nor-4-androstene-3,17-dione, prepared as described in (a), above. The mixture so obtained was maintained under an atmosphere of nitrogen for about 5 hours, after which time the excess sodium acetylide was destroyed by dropwise addition of water. About 2 ml. of water and 5 ml. of methanol was added to obtain a clear solution which was then heated on a steam bath for 1 hour. The mixture so obtained was extracted with ether and the ethereal extract washed successively with dilute hydrochloric acid, dilute sodium carbonate, and water, then dried over anhydrous magnesium sulfate. The dried solution was filtered and the filtrate evaporated to dryness. The residue was triturated with a mixture of ether and Skellysolve B and recrystallized twice from a mixture of acetone and Skellysolve B. There was thus obtained 0.161 g. of 7α-methyl-19-nor-17β-hydroxy-17α-ethynyl-4-androsten-3-one (III) with a melting point of 197 to 199.5° C.;

$\lambda_{max.}^{ethanol}$ 240.5 mμ; $\nu_{max.}^{Nujol}$ 3,390, 3,240, 2,100; 1,663 and 1,623 cm.$^{-1}$

*Analysis.*—Calcd. for $C_{21}H_{28}O_2$: C, 80.72; H, 9.03. Found: C, 80.44; H, 9.05.

If desired, the crude product can be chromatographed prior to crystallization.

Following the procedure of Example 5 but substituting 2α,7α-dimethyl-19-nor-4-androstene-3,17-dione (II) and 2α,7α-dimethyl-4-androstene-3,17-dione (II) for the starting material employed therein, yields, respectively, (a) 2α,7α-dimethyl-19-nor-4-androstene-3,17-dione 3-pyrrolidinyl enamine and 2α,7α-dimethyl-4-androstene-3,17-dione 3-pyrrolidinyl enamine and (b) 2α,7α-dimethyl-19-nor-17β - hydroxy-17α-ethynyl-4-androsten-3-one (III), 2α,7α-dimethyl-17β-hydroxy-17α-ethynyl-4-androsten-3-one (III).

Following the procedure of Example 5 but substituting the following reagents for sodium acetylide:

(1) sodium methylacetylide,
(2) sodium chloroacetylide,
(3) sodium bromoacetylide and
(4) sodium trifluoromethylacetylide, yields, respectively, (1) 7α-methyl-19-nor-17β-hydroxy-17α-(1-propynyl)-4-androsten-3-one (III),
(2) 7α-methyl-19-nor-17β-hydroxy-17α-chloroethynyl-4-androsten-3-one (III),
(3) 7α-methyl-19-nor-17β-hydroxy-17α-bromoethynyl-4-androsten-3-one (III) and
(4) 7α-methyl-19-nor-17β-hydroxy-17α-trifluoromethylethynyl-4-androsten-3-one (III).

Following the procedure of Example 5 and the two hereinabove paragraphs yields:

(1) 2α,7α-dimethyl-19-nor-17β-hydroxy-17α-(1-propynyl)-4-androsten-3-one (III),
(2) 2α,7α-dimethyl-17β-hydroxy-17α(1-propynyl)-4-androsten-3-one (III),
(3) 2α,7α-dimethyl-19-nor-17β-hydroxy-17α-chloroethynyl-4-androsten-3-one (III),
(4) 2α,7α-dimethyl-17β-hydroxy-17α-chloroethynyl-4-androsten-3-one (III),
(5) 2α,7α-dimethyl-19-nor-17β-hydroxy-17α-bromoethynyl-4-androsten-3-one (III),
(6) 2α,7α-dimethyl-17β-hydroxy-17α-bromoethynyl-4-androsten-3-one (III),
(7) 2α,7α-dimethyl-19-nor-17β-hydroxy-17α-trifluoromethylethynyl-4-androsten-3-one (III) and
(8) 2α,7α-dimethyl-17β-hydroxy-17α-trifluoromethyl-4-androsten-3-one (III).

Following the procedures of Example 5 and the subsequent two paragraphs, but substituting the respective 3-enamine, 3-ketal or 3-enol ether of the following starting materials prepared from the corresponding 3-ketosteroid, e.g., in the manner disclosed in J. Amer. Chem. Soc. 78, 430, ibid. 80, 4717 and ibid. 75, 650, respectively;

(a) 7α-methyl-4-androstene-3,17-dione (II),
(b) 7α-methyl-19-nor-4-androstene-3,17-dione (II),
(c) 2α,7α-dimethyl-4-androstene-3,17-dione (II) and
(d) 2α,7α-dimethyl-19-nor-4-androstene-3,17-dione (II), followed by cleavage of the aforesaid protecting group at the 3-position to restore the 3-keto function (in the manner described in the above-cited publications), yields, respectively, (a) (1) 7α-methyl-17β-hydroxy-17α-ethynyl-4-androsten-3-one (III),
(a) (2) 7α-methyl-17β-hydroxy-17α(1-propynyl)-4-androsten-3-one (III),
(a) (3) 7α-methyl-17β-hydroxy-17α-chloroethynyl-4-androsten-3-one (III),
(a) (4) 7α-methyl-17β-hydroxy-17α-bromoethynyl-4-androsten-3-one (III),
(a) (5) 7α-methyl-17β-hydroxy-17β-trifluoromethylethynyl-4-androsten-3-one (III),
(b) (1) 7α-methyl-19-nor-17β-hydroxy-17α-ethynyl-4-androsten-3-one (III),
(b) (2) 7α-methyl-19-nor-17β-hydroxy-17α-(1-propynyl)-4-androsten-3-one (III),
(b) (3) 7α-methyl-19-nor-17β-hydroxy-17α-chloroethynyl-4-androsten-3-one (III),
(b) (4) 7α-methyl-19-nor-17β-hydroxy-17α-bromoethynyl-4-androsten-3-one (III),
(b) (5) 7α-methyl-19-nor-17β-hydroxy-17α-trifluoromethylethynyl-4-androsten-3-one (III),
(c) (1) 2α,7α-dimethyl-17β-hydroxy-17α-ethynyl-4-androsten-3-one (III),
(c) (2) 2α,7α-dimethyl-17β-hydroxy-17α-(1-propynyl-4-androsten-3-one (III),
(c) (3) 2α,7α-dimethyl-17β-hydroxy-17α-chloroethynyl-4-androsten-3-one (III),
(c) (4) 2α,7α-dimethyl-17β-hydroxy-17α-bromoethynyl-4-androsten-3-one (III), (c) (5) 2α,7α-dimethyl-17β-hydroxy-17α-trifluoromethylethynyl-4-androsten-3-one (III),
(d) (1) 2α,7α-dimethyl-19-nor-17β-hydroxy-17α-ethynyl-4-androsten-3-one (III),
(d) (2) 2α,7α-dimethyl-19-nor-17β-hydroxy-17α-(1-propynyl)-4-androsten-3-one (III),
(d) (3) 2α,7α-dimethyl-19-nor-17β-hydroxy-17α-chloroethynyl-4-androsten-3-one (III),
(d) (4) 2α,7α-dimethyl-19-nor-17β-hydroxy-17α-bromoethynyl-4-androsten-3-one (III) and
(d) (5) 2α,7α-dimethyl-19-nor-17β-hydroxy-17α-trifluoromethylethynyl-4-androsten-3-one (III).

*Example 6.—7α-methyl-19-nor-17β-hydroxy-17α-ethyl-4-androsten-3-one (7α-methyl-17α-ethyl-19-nortestosterone) (IV)*

A suspension of 90 mg. of 1 percent palladium on carbon catalyst in 50 ml. of dioxane (purified as described in Fieser, "Methods of Organic Chemistry," page 368, 2nd edition) was saturated with hydrogen at atmospheric pressure. To the dioxane suspension 300 mg. of 7α-methyl-19-nor-17β-hydroxy-17α-ethynyl-4-androsten-3-one (III), prepared as in Example 5(b), was added and hydrogenated at atmospheric pressure until two equivalents of hydrogen was consumed. The reaction mixture was filtered through a bed of Celite (diatomaceous earth), the filtrate concentrated to dryness and chromatographed through a 100 g. column of Florisil packed wet with Skellysolve B. Elution by a gradient technique employing between 4 l. of 2 percent acetone Skellysolve B and 4 l. of 8 percent acetone Skellysolve B collecting 250 ml. fractions, gave the desired product as an oil in fractions 21 to 30. The oil was crystallized twice from a mixture of Skellysolve B and ether to give 160 mg. of 7α-methyl-19-nor-17β-hydroxy-17α-ethyl-4-androsten-3-one (IV), melting at 132 to 135° C.

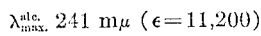
241 mμ (ε=11,200)

An analytical sample from another run melted at 138 to 139° C.

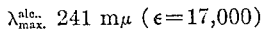
241 mμ (ε=17,000)

*Analysis.*—Calcd. for $C_{21}H_{32}O_2$: C, 79.69; H, 10.19. Found: C, 79.42; H, 10.23.

Following the procedure of Example 6 but substituting the following compounds for the starting material employed therein:
(a) 7α-methyl-17β-hydroxy-17α-ethynyl-4-androsten-3-one (III),
(b) 2α,7α-dimethyl-17β-hydroxy-17α-ethynyl-4-androsten-3-one (III) and
(c) 2α,7α-dimethyl-19-nor-17β-hydroxy-17α-ethynyl-4-androsten-3-one (III), yields the corresponding 17α-ethyl counterparts of (a), (b), (c), and (d) of Formula IV.

Following the procedure of Example 6 but substituting the following compounds for the starting material employed therein:

(1) 7α-methyl-17β-hydroxy-17α-(1-propynyl)-4-androsten-3-one (III),
(2) 7α-methyl-17β-hydroxy-17α-trifluoromethylethynyl-4-androsten-3-one (III),
(3) 7α-methyl-19-nor-17β-hydroxy-17α-(1-propynyl)-4-androsten-3-one (III),
(4) 7β-methyl-19-nor-17β-hydroxy-17α-trifluoromethylethynyl-4-androsten-3-one (III),
(5) 2α,7α-dimethyl-17β-hydroxy-17α-(1-propynyl)-4-androsten-3-one (III),
(6) 2α,7α-dimethyl-17β-hydroxy-17α-trifluoromethylethynyl-4-androsten-3-one (III),
(7) 2α,7α-dimethyl-19-nor-17β-hydroxy-17α-(1-propynyl)-4-androsten-3-one (III),
(8) 2α,7α-dimethyl-19-nor-17β-hydroxy-17α-trifluoromethylethynyl-4-androsten-3-one (III), yields, respectfully, (1) 7α-methyl-17β-hydroxy-17α-(3-propyl)-4-androsten-3-one (IV),
(2) 7α-methyl-17β-hydroxy-17α-trifluoromethyl-4-androsten-3-one (IV),
(3) 7α-methyl-19-nor-17β-hydroxy-17α-(3-propyl)-4-androsten-3-one (IV),
(4) 7α-methyl-19-nor-17β-hydroxy-17α-trifluoromethyl-4-androsten-3-one (IV),
(5) 2α,7α-dimethyl-17β-hydroxy-17α-(3-propyl)-4-androsten-3-one (IV),
(6) 2α,7α-dimethyl-17β-hydroxy-17α-trifluoromethyl-4-androsten-3-one (IV),
(7) 2α,7α-dimethyl-19-nor-17β-hydroxy-17α-(3-propyl)-4-androsten-3-one (IV) and
(8) 2α,7α-dimethyl-19-nor-17β-hydroxy-17α-trifluoromethyl-4-androsten-3-one (IV).

*Example 7.—7α,17α-dimethyl-19-nor-17β-hydroxy-4-androsten-3-one (V)*

A solution of 2 g. of 7α-methyl-19-nor-4-androstene-3,17-dione-3-pyrrolidyl enamine (II) (prepared as in Example 5(a), above in 100 ml. of 2 N methylmagnesium bromide in a mixture of equal volumes of benzene and tetrahydrofuran, is heated under reflux for about 18 hours to yield 7α,17α-dimethyl-19-nor-17β-hydroxy-4-androsten-3-one 3-pyrrolidyl enamine. The 3-enamine function is hydrolyzed to yield the corresponding free 3-ketone in the manner described in Example 5(b), above. The desired product is eluted and crystallized from aqueous acetone to give 7α,17α-dimethyl-19-nor-17β-hydroxy-4-androsten-3-one (V).

Following the procedure of Example 7 but substituting for methylmagnesium bromide, the following Grignard reagents:

(1) ethylmagnesium bromide (or chloride),
(2) n-propylmagnesium bromide (or chloride),
(3) i-propylmagnesium bromide (or chloride) and,
(4) n-butylmagnesium bromide (or chloride), yields, respectively, (1) 7α-methyl-17α-ethyl-19-nor-17β-hydroxy-4-androsten-3-one (V),
(2) 7α-methyl-17α-n-propyl-19-nor-17β-hydroxy-4-androsten-3-one (V),
(3) 7α-methyl-17α-i-propyl-19-nor-17β-hydroxy-4-androsten-3-one (V) and
(4) 7α-methyl-17α-n-butyl-19-nor-17β-hydroxy-4-androsten-3-one (V).

Following the procedures of Example 7 and the paragraph immediately preceding the present one, reaction of the following pairs of starting materials and (1) 7α-methyl-19-nor-4-androstene-3,17-dione 3-pyrrolidinyl enamine [prepared as in Example 5(a)] and ethylmagnesium bromide,
(2) 7α-methyl-4-androstene-3,17-dione 3-pyrrolidinyl enamine and n-propylmagnesium bromide,
(3) 2α,7α-dimethyl-19-nor-4-androstene-3,17-dione 3-pyrrolidinyl enamine and methylmagnesium bromide and
(4) 2α,7α-dimethyl-4-androstene-3,17-dione 3-pyrrolidinyl enamine and methylmagnesium bromide, followed by hydrolyzing the products with a base, yields, respectively, (1) 7α-methyl-17α-ethyl-19-nor-17β-hydroxy-4-androsten-3-one (V),
(2) 7α-methyl-17α-n-propyl-17β-hydroxy-4-androsten-3-one (V),
(3) 2α,7α,17α-trimethyl-19-nor-17β-hydroxy-4-androsten-3-one (V) and
(4) 2α,7α,17α-trimethyl-17β-hydroxy-4-androsten-3-one (V), Following the procedure of the Example 7 and the paragraph thereafter, reaction of the following pairs of starting materials and Grignard reagents:

(1) 7α-methyl-4-androstene-3,17-dione (II) and isopropyl magnesium bromide,
(2) 7α-methyl-4-androstene-3,17-dione (II) and n-butyl-magnesium bromide,
(3) 2α,7α-dimethyl-19-nor-4-androstene-3,17-dione (II) and methylmagnesium bromide, and
(4) 2α,7α-dimethyl-4-androstene-3,17-dione (II) and ethylmagnesium bromide, yields, respectively, (1) 7α-methyl-17α-isopropyl-17β-hydroxy-4-androsten-3-one (V),
(2) 7α-methyl-17α-n-butyl-17β-hydroxy-4-androsten-3 one (V),
(3) 2α,7α,17α-trimethyl-19-nor-17β-hydroxy-4-androsten-3-one (V) and
(4) 2α,17α-dimethyl-17α-ethyl-17β-hydroxy-4-androsten-3-one (V).

The 7α-methyl (and 2α,7α-dimethyl)-17α-alkyl-17β-hydroxy compounds (V) produced in Example 7 and the three paragraphs immediately above, can be converted to their corresponding 17-acylates by following the procedures of Example 4 and the paragraph thereafter.

*Example 8.—7α-methyl-3,5-androstadiene-3,17β-diol 3,17-diacetate (Ia)*

A solution of 1 g. of 7α-methyl-17β-hydroxy-4-androsten-3-one (I) (prepared as in J. Amer. Chem. Soc., 81 4069), 100 mg. of paratoluenesulfonic acid and 10 ml. of acetic anhydride in 40 ml. of toluene was heated at reflux under nitrogen for about 4.5 hours. The solvent was evaporated with a stream of nitrogen and the crystalline residue triturated with a small amount of aqueous methanol to yield crystal 7α-methyl-3,5-androstadiene-3,17β-diol 3,17-diacetate (Ia).

*Example 9.—7α-methyl-19-nor-3,5-androstadiene-3,17β-diol 3,17-diacetate (Ia)*

A solution of 1 g. of 7α-methyl-19-nor-17β-hydroxy-4-androsten-3-one (I) (prepared as in Example 28 of Belgian Patent 610,385), 40 mg. of paratoluenesulfonic acid, 8 ml. of acetic anhydride in 20 ml. of toluene was refluxed under nitrogen for about 5 hours. Most of the solvent was removed with a stream of nitrogen to give a sticky precipitate. A few milliliters of methanol containing a few drops of pyridine was added to the precipitate to yield loose crystals which were filtered immediately, washed with cold methanol and dried to yield 0.9 g. of the desired enol acetate (Ia). This product was recrystallized by dissolving in methylene chloride and diluting with methanol at room temperature to give pure 7α - methyl - 19 - nor-3,5-androstadiene-3,17β-diol 3,17-diacetate (Ia) having a rotation [α]$_D$ of —122° (chloroform) and $\lambda^{alc}_{max.}$ 235 mμ ($\epsilon = 19,250$)

*Analysis.*—Calcd. for $C_{23}H_{32}O_4$: C, 74.16; H, 8.66. Found: C, 73.69; H, 8.40.

*Example 10.—7α,17α-dimethyl-3,5-androstadiene-3,17β-diol 3,17-diacetate (Ia)*

A solution of 1 g. of 7α,17α-dimethyl-17α-hydroxy-4-androsten-3-one 17-acetate (I) prepared as in Example 3), 100 mg. of paratoluenesulfonic acid and 10 ml. of acetic anhydride in 40 ml. of toluene was heated at reflux under nitrogen for about 4.5 hours. The solvent was then removed with a stream of nitrogen to leave a residue that was triturated with Skellysolve B. Two crops of crystals were obtained from the Skellysolve B. The combined crops were triturated with methanol and removed most of the color to give 0.57 g. of 7α,17α-dimethyl - 3,5 - androstadiene-3,17α-diol 3,17-diacetate (Ia) having $\lambda^{alc}_{max.}$ 234.5 mμ ($\epsilon = 20,450$), 244 mμ ($\epsilon = 15,650$)

with a shoulder at 230 mμ.

If desired the crude product is chromatographed prior to crystallization.

Following the procedures of Examples 8, 9 and 10 but substituting for acetic anhydride another anhydride or acid chloride, such as propionic, butyric, valeric, hexanoic, trimethylacetic, isobutyric, isovaleric, cyclohexanecarboxylic, p - hexylpropionic, benzoic, phenylacetic, phenylpropionic, acrylic, crotonic, undecylenic, propiolic, and cinnamic, yields, respectively, the corresponding 7α - methyl-3,5-androstadiene-3,17β-diol 3,17-diacylate (Ia), 7α - methyl - 19-nor-3,5-androstadiene-3,17β - diol 3,17-diacylate (Ia) and 7α,17α-dimethyl-3,5-androstadiene-3,17β-diol 3,17-diacylate (Ia).

Following the procedures of Examples 8, 9 and 10 but substituting for the starting steroids employed therein the following representative compounds:

(1) 2α,7α-dimethyl-17β-hydroxy-4-androsten-3-one (I),
(2) 2α,7α-dimethyl-19-nor-17β-hydroxy-4-androsten-3-one (I),
(3) 2α,7α,17α-trimethyl-17β-hydroxy-4-androsten-3-one (I),
(4) 7α,17α-dimethyl-19-nor-17β-hydroxy-4-androsten-3-one (I),
(5) 7α-methyl-19-nor-17β-hydroxy-17α-ethynyl-4-androsten-3-one (III),
(6) 7α-methyl-17β-hydroxy-17α-ethynyl-4- androsten-3-one (III),
(7) 7α-methyl-19-nor-17β-hydroxy-17α-(1-propynyl)-4-androsten-3-one (III),
(8) 7α-methyl-17β-hydroxy-17α-trifluoromethylethynyl-4-androsten-3-one (III),
(9) 2α,7α-dimethyl-17β-hydroxy-17α-chloroethynyl-4-androsten-3-one (III),
(10) 2α,7α-dimethyl-19-nor-17β-hydroxy-17α-bromoethynyl-4-androsten-3-one (III),
(11) 7α-methyl-19-nor-17β-hydroxy-17β-ethyl-4-androsten-3-one (IV),
(12) 7α-methyl-17β-hydroxy-17α-n-propyl-4-androsten-3-one (IV),
(13) 7α-methyl-19-nor-17β-hydroxy-17α-trifluoromethyl-4-androsten-3-one (IV),
(14) 2α,7α-dimethyl-19-nor-17a-hydroxy-17α-ethyl-4-androsten-3-one (IV),
(15) 2α,7α-dimethyl-17β-hydroxy-17α-ethyl-4-androsten-3-one (IV),
(16) 2α,7α-dimethyl-17α-ethyl-19-nor-17β-hydroxy-4-androsten-3-one (V) and
(17) 2α,7α-dimethyl17α-n-propyl-17β-hydroxy-4-androsten-3-one (V), yields, respectively, (1) 2α,7α-dimethyl-3,5-androstadiene-3,17β-diol 3,17-diacetate (Ia),
(2) 2β,7β-dimethyl-19-nor-3,5-androstadiene-3,17β-diol 3,17-diacetate (Ia),
(3) 2α,7α,17α-trimethyl-3,5-androstadiene-3,17β-diol 3,17-diacetate (Ia),
(4) 7α,17α-dimethyl-19-nor-3,5-androstadiene-3,17β-diol 3,17-diacetate (Ia),
(5) 17α-ethynyl-7α-methyl-19-nor-3,5-androstadiene-3,17β-diol 3,17-diacetate (IIIa),
(6) 17β-ethynyl-7α-methyl-3,5-androstadiene-3,17β-diol 3,17-diacetate (IIIa),
(7) 7β-methyl-17α-propynyl-19-nor-3,5-androstadiene-3,17β-diol 3,17-diacetate (IIIa),
(8) 7α-methyl-17α-trifluoromethylethynyl-3,5-androstadiene-3,17β-diol,
(9) 17β-chloroethynyl-2α,7α-dimethyl-3,5-androstadiene-3,17β-diol 3,17-diacetate (IIIa),

(10) 17α-bromoethynyl-2α,7α-dimethyl-19-nor-3,5-androstadiene-3,17β-diol 3,17-diacetate (IIIa),
(11) 17α-ethyl-7α-methyl-19-nor-3,5-androstadiene-3,17β-diol 3,17-diacetate (IVa),
(12) 7α-methyl-17α-n-propyl-3,5-androstadiene-3,17β-diol 3,17-diacetate (IVa),
(13) 7α-methyl-17α-trifluoromethyl ethynyl-19-nor-3,5-androstadiene-3,17β-diol 3,17-diacetate (IVa),
(14) 17α-ethyl-2α,7α-dimethyl-19-nor-3,5-androstadiene-3,17β-diol 3,17-diacetate (IVa),
(15) 17α-ethyl-2α,7α-dimethyl-3,5-androstadiene-3,17β-diol 3,17-diacetate (IVa),
(16) 2α,7α-dimethyl-17α-ethyl-19-nor-3,5-androstadiene-3,17β-diol 3,17-diacetate (Va) and
(17) 2a,7α-dimethyl-17α-n-propyl-3,5-androstadiene-3,17β-diol 3,17-diacetate (Va).

Similarly, by following the procedures of the two preceding paragraphs and reacting the Δ⁴-3-keto starting materials of (1) through (17) of the immediately preceding paragraph with the appropriate hydrocarbon carboxylic acid anhydride instead of acetic anhydride employed to prepare the products of (1) through (17) there are produced the corresponding 3,5-androstadiene 3,17-diacylates of (1) through (17) such as the 3,17-dibutyrate, 3,17-divalerate, 3,17-dihexanoate, 3,17-ditrimethylacetate, 3,17-diisobutyrate, 3,17-diisovalerate 3,17-dicyclohexanecarboxylate, 3,17-dicyclopentylpropionate, 3,17-di-p-hexylpropionate, 3,17-dibenzoate, 3,17-diphenylacetate, 3,17-diacrylate, 3,17-dicrotonate, 3,17-diundecylanate, 3, 17-dipropiolate, and 3,17-dicinnamate.

*Example 11.—7α,17α-dimethyl-3,5-androstadiene-3,17β-dihydroxy-3-acetate (Ia)*

To a solution of 100 ml. of tetrahydrofuran (purified by percolation through an alumina column) cooled in an ice bath, 25 ml. of ethereal 3 M methyl magnesium bromide and 1.5 g. of cuprous chloride are successively added. A solution of 5 g. of 17α-methyl-17β-hydroxy-4,6-androstadien-3-one (prepared as in J. Amer. Chem. Soc., 81, 4069) in 120 ml. of tetrahydrofuran (purified as above) is added slowly with stirring. The whole operation is done under nitrogen. After about 5 minutes, 20 ml. of acetic anhydride in 20 ml. of tetrahydrofuran (also purified as above) are slowly added. The mixture is stirred for about an additional 2.5 hours; 100 ml. of ether are added and 3 N hydrochloric acid saturated with sodium chloride (well purged with nitrogen to remove all traces of oxygen) are carefully added to the mixture. The organic phase is washed again with nitrogen purged 3 N hydrochloric acid saturated with sodium chloride, saturated sodium chloride solution, 5% sodium hydroxide solution saturated with sodium chloride and finally with saturated sodium chloride solution until neutral. The solution is dried over sodium sulfate and concentrated to dryness. The crude residue is purified by chromatography to yield 7α,17α - dimethyl-3,5-androstadiene-3,17β-dihydroxy 3-acetate (Ia).

Following the procedure of Example 11 but substituting for acetic anhydride another anhydride, such as propionic, butyric, valeric, hexanoic, trimethylacetic, isobutyric, isovaleric, cyclohexanecarboxylic, p-hexylpropionic, benzoic, phenylacetic, phenylpropionic, acrylic, crotonic, undecylenic, propiolic, and cinnamic, yields the corresponding 7α,17α-dimethyl-3,5-androstadiene-3,17β-dihydroxy 3 monoacylate (Ia).

Following the procedure of Example 11 but substituting for 17α-methyl-17β-hydroxy-4,6-androstadien-3-one the following representative starting materials:

(1) 17β-methyl-19-nor-17β-hydroxy-4,6-androstadien-3-one,
(2) 2α,17α-dimethyl-17β-hydroxy-4,6-androstadien-3-one,
(3) 2α,17α-dimethyl-19-nor-17β-hydroxy-4,6-androstadien-3-one,
(4) 4,6-androstadien-3,17-dione,
(5) 19-nor-4,6-androstadien-3,17-dione,
(6) 2α-methyl-4,6-androstadien-3,17-dione,
(7) 2α-methyl-19-nor-4,6-androstadien-3,17-dione,
(8) 17β-hydroxy-17α-ethynyl-4,6-androstadien-3-one,
(9) 2α-methyl-19-nor-17β-hydroxy-17α-ethynyl-4,6-androstadien-3-one,
(10) 17β-hydroxy-17α(1-propynyl)-4,6-androstadien-3-one,
(11) 17β-hydroxy-17α-trifluoromethylethynyl-4,6-androstadien-3-one,
(12) 2α-methyl-17β-hydroxy-17α-chloroethynyl-4,6-androstadien-3-one,
(13) 2α-methyl-19-nor-17β-hydroxy-17α-bromoethynyl-4,6-androstadien-3-one,
(14) 19-nor-17β-hydroxy-17α-ethyl-4,6-androstadien-3-one,
(15) 17β-hydroxy-17α-(n-propyl)-4,6-androstadien-3-one,
(16) 19-nor-17β-hydroxy-17α-trifluoromethyl-ethynyl-4,6-androstadien-3-one,
(17) 17α-ethyl-19-nor-17β-hydroxy-4,6-androstadien-3-one and
(18) 2α-methyl-17α-n-propyl-17β-hydroxy-4,6-androstadien-3-one, yields, respectively, (1) 7α,17α-dimethyl-19-nor-3,5-androstadiene-3,17β-diol-3-acetate (Ia),
(2) 2α,7α-17α-trimethyl-3,5-androstadiene-3,17β-diol 3-acetate (Ia),
(3) 2α,7α,17α-trimethyl-19-nor-3,5-androstadiene-3,17β-diol 3-acetate (Ia),
(4) 7α-methyl-3,5-androstadien-17-one 3-acetate (IIa),
(5) 7α-methyl-19-nor-3,5-androstadien-17-one 3-acetate (IIa),
(6) 2α,7α-dimethyl-3,5-androstadien-17-one 3-acetate (IIa),
(7) 2α,7α-dimethyl-19-nor-3,5-androstadien-17-one 3-acetate (IIa),
(8) 17α-ethynyl-7α-methyl-3,5-androstadien-3,17β-diol 3-acetate (IIIa),
(9) 17α-ethynyl-2α,7α-dimethyl-19-nor-3,5-androstadien-3,17β-diol 3-acetate (IIIa),
(10) 7α-methyl-17α(1-propynyl)-3,5-androstadiene-3,17β-diol 3-acetate (IIIa),
(11) 7α-methyl-17α-trifluoromethylethynyl-3,5-androstadiene-3,17β-diol 3-acetate (IIIa)
(12) 17α-4-chloroethynyl-2α,7α-dimethyl-3,5-androstadiene-3,17β-diol 3-acetate (IIIa),
(13) 17α-bromoethynyl-2α,7α-dimethyl-3,5-androstadiene-3,17β-diol 3-acetate (IIIa),
(14) 17α-ethyl-7α-methyl-19-nor-3,5-androstadiene-3,17β-diol 3-acetate (IVa),
(15) 7α-methyl-17α-(n-propyl)-3,5-androstadiene-3,17β-diol 3-acetate (IVa),
(16) 7α-methyl-17α-trifluoromethylethynyl-19-nor-3,5-androstadiene-3,17β-diol 3-acetate (IVa),
(17) 17α-ethyl-7α-methyl-19-nor-3,5-androstadiene-3,17β-diol 3-acetate (Va) and
(18) 2α,7α-dimethyl-17α-n-propyl-3,5-androstadiene-3,17β-diol 3-acetate (Va).

Similarly, by following the procedures of the preceding two paragraphs and reacting the Δ⁴,⁶-3-keto starting materials of (1) through (18) of the immediately preceding paragraph with the appropriate hydrocarbon carboxylic acid anhydride in the manner described in Example 11, there are produced the corresponding 3,5-androstadien 3-acylates of (1) through (18).

*Example 12.—7α-methyl-3,5-androstadiene-3,17β-hydroxy 3,17-diacetate (Ia)*

To a solution of 100 ml. of tetrahydrofuran (purified by percolation through an alumina column) cooled in an ice bath, 25 ml. of ethereal 3 M methyl magnesium bromide and 1.5 g. of cuprous chloride are successively added. A solution of 5 g. of 17β-hydroxy-4,6-androstadien-3-one (prepared as in J. Amer. Chem. Soc., 81, 4069) in 120 ml. of tetrahydrofuran (purified as above) is slowly added with stirring. The whole operation is done under nitrogen. After about 5 minutes, 20 ml. of acetic anhydride in 20 ml. of tetrahydrofuran (also purified as above) is slowly added. The mixture is stirred for about an additional 2.5 hours; 100 ml. of ether is added and 3 N hydrochloric acid saturated with sodium chloride (well purged with nitrogen to remove all traces of oxygen) is carefully added to the mixture. The organic phase is washed again with nitrogen purged 3 N hydrochloric acid saturated with sodium chloride, saturated sodium chloride solution, 5% sodium hydroxide solution saturated with sodium chloride and finally with saturated sodium chloride solution until neutral. The solution is dried over sodium sulfate and concentrated to dryness. The crude residue is purified by chromatography to yield 7α - methyl - 3,5 - androstadiene-3, 17β-hydroxy 3,17-diacetate (Ia).

Following the procedure of Example 12 but substituting for acetic anhydride another anhydride, such as propionic, butyric, valeric, hexanoic, trimethylacetic, isobutyric, isovaleric, cyclohexanecarboxylic, p-hexylpropionic, benzoic, phenylacetic, acrylic, crotonic, undecylenic, propiolic, cinnamic, and yields the corresponding 7α-methyl-3,5-androstadiene-3,17β-dihydroxy-3,17-diacylate (Ia).

Following the precedure of Example 12 but substituting for 17β-hydroxy-4,6-androstadien-3-one the following representative starting materials:

(1) 19-nor-17β-hydroxy-4,6-androstadien-3-one,
(2) 2α-methyl-17β-hydroxy-4,6-androstadien-3-one,
(3) 2α-19-nor-17β-hydroxy-4,6-androstadien-3-one, yields, respectively, (1) 7α-methyl-19-nor-3,5-androstadiene-3,17β-diol 3,17-diacetate (Ia),
(2) 2α,7α-dimethyl-3,5-androstadiene-3,17β-diol 3,17-diacetate (Ia), and
(3) 2α,7α-dimethyl-19-nor-3,5-androstadiene-3,17β-diol 3,17-diacetate (Ia).

Similarly, by following the procedures of the preceding two paragraphs and reacting the Δ⁴,⁶-3-keto starting materials of (1) through (3) of the immediately preceding paragraph with the appropriate hydrocarbon carboxylic acid anhydride in the manner described in Example 12, there are produced the corresponding 3,5-androstadien 3,11-diacylates of (1) through (3).

*Example 13.—3-ethoxy-7α-methyl-19-nor-3,5-androstadien-17-one (IIa)*

To a 5 l., 3-necked, round-bottom flask equipped with stirrer, condenser and heating mantle, there are added 750 g. of the known compound, 7α-methyl-19-nor-4-androstene-3,17-dione (II), 1875 ml. of triethyl orthoformate and 37.5 g. of p-toluenesulfonic acid. The reaction mixture is heated to reflux temperature and 300 ml. of condensate removed over a period of about 30 minutes. Heating at reflux is continued for about an additional 15 minutes (until the reaction goes to completion), after which the reaction mixture is allowed to cool to a temperature of about 40° C. About 1.5.1 of Skellysolve B (hexane hydrocarbons) are slowly added to the reaction mixture during vigorous stirring. After standing at between 5 to 10° C. for a period of about 15 hours the product is collected on a Buchner funnel by vacuum filtration, washed with about 500 ml. of Skellysolve B and dried under vacuum to yield pure 3-ethoxy-7α-methyl-19-nor-3,5-androstadien-17-one (IIa).

Following the procedure of Example 12 but substituting other trialkyl orthoformates for triethyl orthoformate yields the corresponding 3-alkoxy-7α-methyl-19-nor-3,5-androstadien-17-one (IIa).

Following the procedure of Example 13 but substituting for 7α - methyl-19-nor-4-androstene-3,17-dione (II) the following representative starting materials:

(1) 2α,7α-dimethyl-17β-hydroxy--4-androsten-3-one (I),
(2) 2α,7α-dimethyl-19-nor-17β-hydroxy-4-androsten-3-one (I),
(3) 2α,7α,17α-trimethyl-17β-hydroxy-4-androsten-3-one (I),
(4) 7α,17α-dimethyl-19-nor-17β-hydroxy-4-androsten-3-one (I),
(5) 7α-methyl-4-androstene-3,17-dione (II),
(6) 2α,7α-dimethyl-19-nor-4-androstene-3,17-dione (II),
(7) 2α,7α-dimethyl-4-androstene-3,17-dione (II),
(8) 7α-methyl-19-nor-17β-hydroxy-17α-ethynyl-4-androsten-3-one (III),
(9) 7α-methyl-17β-hydroxy-17α-ethynyl-4-androsten-3-one (III),
(10) 7α-methyl-19-nor-17β-hydroxy-17α-(1-propynyl)-4-androsten-3-one (III),
(11) 7α-methyl-17β-hydroxy-17α-trifluoromethylethynyl-4-androsten-3-one (III),
(12) 2α,7α-dimethyl-17β-hydroxy-17α-chloroethylnyl-4-androsten-3-one (III),
(13) 2α,7α-dimethyl-19-nor-17β-hydroxy-17α-bromoethynyl-4-androsten-3-one (III),
(14) 7α-methyl-19-nor-17β-hydroxy-17α-ethyl-4-androsten-3-one (IV),
(15) 7α-methyl-17β-hydroxy-17α-(n-propyl)-4-androsten-3-one (IV),
(16) 7α-methyl-19-nor-17β-hydroxy-17α-trifluoromethylethynyl-4-androsten-3-one (IV),
(17) 7α-methyl-17α-ethyl-19-nor-17β-hydroxy-4-androsten-3-one (V) and
(18) 2α,7α-dimethyl-17α-n-propyl-17β-hydroxy-4-androsten-3-one (V), yields, respectively, (1) 3-ethoxy-2α,7α-dimethyl-3,5-androstadien-17β-ol (Ia),
(2) 3-ethoxy-2α,7α-dimethyl-19-nor-3,5-androstadien-17β-ol (Ia),
(3) 3-ethoxy-2α,7α,17α-trimethyl-3,5-androstadien-17β-ol (Ia),
(4) 3-ethoxy-7α,17α-dimethyl-19-nor-3,5-androstadien-17β-ol (Ia),
(5) 3-ethoxy-7α-methyl-3,5-androstadien-17-one (IIa),
(6) 3-ethoxy-7α-methyl-19-nor-3,5-androstadien-17-one (IIa),
(7) 3-ethoxy-2α,7α-dimethyl-3,5-androstadien-17-one (IIa),
(8) 3-ethoxy-17α-ethynyl-7α-methyl-19-nor-3,5-androstadien-17β-ol (IIIa),
(9) 3-ethoxy-17α-ethynyl-7α-methyl-3,5-androstadien-17β-ol (IIIa),
(10) 3-ethoxy-7α-methyl-17α(1-propyne)-3,5-androstadien-17β-ol (IIIa),
(11) 3-ethoxy-7α-methyl-17α-trifluoromethyl-ethynyl-3,5-androstadien-17β-ol (IIIa),
(12) 3-ethoxy-17α-chloroethynyl-2α,7α-dimethyl-3,5-androstadien-17β-ol (IIIa),
(13) 3-ethoxy-17β-bromoethynyl-2α,7α-dimethyl-19-nor-3,5-androstadien-17β-ol (IIIa),
(14) 3-ethoxy-17α-ethyl-7α-methyl-19-nor-3,5-androstadien-17β-ol (IVa),
(15) 3-ethoxy-7α-methyl-17α-(propyl)-17β-ol (IVa),
(16) 3-ethoxy-7α-methyl-17α-trifluoromethyl-ethynyl-19-nor-3,5-androstadien-17β-ol (IVa),
(17) 3-ethoxy-7α-methyl-17α-ethyl-19-nor-3,5-androstadien-17β-ol (Va), and
(18) 3-ethoxy-2α,7α-dimethyl-17α-n-propyl-3,5-androstadien-17β-ol (Va).

Similarly, by following the procedures of the two preceding paragraphs and reacting the Δ⁴-3-keto starting materials of (1) through (18) of the immediately preceding paragraph with the appropriate trialkyl orthoformate in the manner disclosed in Example 13, there are produced the corresponding 3,5-androstadien-3-alkoxides of (1) through (18).

As indicated heretofore, the compounds of this invention are useful in therapy for their anabolic antifertility, antiandrogenic, anti-estrogenic and hypocholesteremic (i.e., reducing blood cholesterol) activities, and particularly in the treatment at atherosclerosis and ateriosclerosis. Adminstration to mammals, including humans, depends on the particular compound involved, severity of the condition being treated and the individual's response to the medication. In general, a dose of about 5 to 1000 mg. of each of the compounds exemplified in Examples 1–13 and embraced within Formulae Ia to Va is given one to three times a day, and preferably about 50 to about 500 mg. thereof one to three times a day, in the treatment of conditions incident to the foregoing activities when incorporated in conventional pharmaceutical compositions.

The following examples illustrate the incorporation of the active ingredients of this invention in pharmaceutical formulation.

*Example 14.—Compressed tablets*

A lot of 10,000 compressed tablets, each containing 10 mg. of 7α-methyl-3,5-androstadiene-3,17β-dihydroxy 3,17-diacetate is prepared from the following ingredients:

|  | Gm. |
|---|---|
| 7α-methyl-3,5-androstadiene-3,17β-dihydroxy 3,17-diacetate | 100 |
| Dicalcium phospate | 2500 |
| Methylcellulose, U.S.P. (15 cps.) | 65 |
| Talc, bolted | 450 |
| Calcium stearate, fine powder | 35 |

The 7α-methyl-β-3,5 - androstadiene - 3,17β-dihydroxy 3,17-diacetate and dicalcium phosphate are mixed well, granulated with 7.5 percent solution of methylcellulose in water, passed through a No. 8 screen and dried at 120° F. The dried granules are passed through No. 12 screen, mixed thoroughly with the talc and stearate and compressed into tablets.

One tablet is given 3 times daily in the oral treatment of hypercholesteremia in adult humans.

*Example 15.—Hard gelatin capsules*

A lot of 1000 hard gelatin capsules, each containing 100 mg. of 7α,17α-dimethyl-3,5-androstadiene-3,17β-dihydroxy 3,17-diacetate is prepared from the following ingredients:

|  | Gm. |
|---|---|
| 7α,17α - dimethyl - 3,5-androstadiene - 3,17β-dihydroxy 3,17-diacetate | 100 |
| Lactose | 150 |
| Calcium stearate | 2 |
| Talc | 3 |

The lactose, talc and stearate are mixed well and the 7α,17α - dimethyl - 3,5-androstadiene-3,17β - dihydroxy 3,17-diacetate incorporated into the mixture. The whole is mixed well and filled into two-piece hard gelatin capsules.

The capsules are used in the reduction of cholesterol levels in adult humans at a dose of 3–6 capsules daily.

*Example 16.—Soft gelatin capsules*

A batch of 1000 soft gelatin capsules, each containing 50 mg. of 2α,7α-dimethyl-3,5-androstadiene-3,17β-dihydroxy 3-acetate and corn oil is prepared from the following materials:

| | |
|---|---|
| 2α,7α-dimethyl - 3,5 - androstadiene-3,17β-dihydroxy 3-acetate, micronized gm | 50 |
| Corn oil | q.s. |

A uniform dispersion of the active ingredient in the corn oil is prepared and the dispersion filled into soft gelatin capsules by conventional means.

One capsule is given three times a day in the treatment of hypercholesteremia in adult humans.

*Example 17.—Aqueous oral suspension*

An aqueous oral suspension containing in each 5 ml. 500 mg of 7α-methyl-3,5-androstadien-3-ethoxy-17β-ol is prepared from the following materials:

| | |
|---|---|
| 7α-methyl - 3,5 - androstadien - 3-ethoxy-17β-ol, micronized gm | 1000 |
| Methylparaben, U.S.P. gm | 7.5 |
| Propylparaben, U.S.P. gm | 2.5 |
| Saccharin sodium gm | 12.5 |
| Cyclamate sodium gm | 2.5 |
| Glycerin ml | 3000 |
| Tragacanth powder gm | 100 |
| Orange oil flavor gm | 10 |
| F. D. and C. orange dye gm | 7.5 |
| Deionized water, q.s. tsp. ml | 10,000 |

One teaspoonfull (5 ml.) three times daily is employed in the treatment of hypercholesteremia in adult humans.

*Example 18.—Aqueous suspension for injection*

A suspending vehicle is prepared from the following materials:

| | |
|---|---|
| Polyethylene glycol 4000 gm | 30 |
| Potassium chloride gm | 11.2 |
| Polysorbate 80 gm | 2 |
| Methylparaben gm | 1.8 |
| Propylparaben gm | 0.2 |
| Water for injection, q.s. ml | 1000 |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 50 gm. of 7α-methyl-19-nor-3,5-androstadiene-3,17β-dihydroxy 3,17-acetate which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 59 mg. of 7α-methyl-19-nor-3,5-androstadiene-3,17β-dihydroxy 3,17-diacetate. The suspension is used intramuscularly in 1-ml. doses in the treatment of hypercholesteremia.

We claim:
1. 7α-methyl-3,5-androstadiene-3,17β-diol 3,17-diacetate.

2. 7α,17α-dimethyl-3,5-androstadiene 3,17β-diol 3,17-diacetate.

3. 7α,17α-dimethyl-3,5-androstadiene-3,17β-diol 3-acetate.

4. 2α,7α-dimethyl-3,5-androstadiene-3,17β-diol 3,17-diacetate.

5. 3-ethoxy-7α-methyl-19-nor-3,5-androstadien-17-one.

6. 3-ethoxy-2α,7α-dimethyl-3,5-androstadien-17-one.

7. 2α,7α - dimethyl - 17 - chlorethynyl - 3,5 - androstadiene-3,17β-diol 3-acetate.

8. 7α-methyl-17α-ethyl-3,5-androstadiene-3,17β-diol 3-acetate.

9. 2α,7α - dimethyl - 17α - n - propyl - 3,5 - androstadiene-3,17β-diol 3-acetate.

10. A process for the production of a compound of the formula

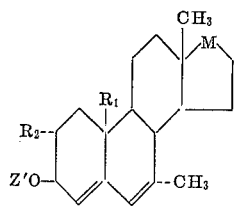

wherein $R_1$ and $R_2$ are selected from the group consisting of hydrogen and methyl; Z' is the lower acyl radical of an organic carboxylic acid containing from one to twelve carbon atoms, inclusive; M is selected from the group consisting of

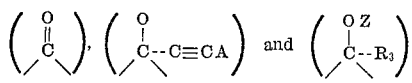

wherein A is selected from the group consisting of hydrogen, lower alkyl of from one to twelve carbon atoms, inclusive, chlorine, bromine and trifluoromethyl, $R_3$ is selected from the group consisting of hydrogen, lower alkyl of from one to twelve carbon atoms, inclusive, and Z is selected from the group consisting of hydrogen and the lower acyl radical of an organic carboxylic acid containing from one to twelve carbon atoms, inclusive, which comprises (1) treating with a methyl magnesium halide in the presence of cuprous chloride catalyst a corresponding compound of the formula

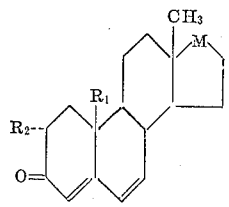

Wherein $R_1$, $R_2$ and M have the same meaning as above, (2) followed by reaction with a compound selected from the group consisting of an anhydride and a chloride of an organic carboxylic acid containing from one to twelve carbon atoms, inclusive.

11. A method for reducing blood cholesterol in mammals comprising: administering to mammals a compound of the formula

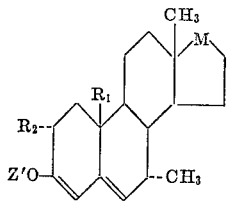

wherein $R_1$ and $R_2$ are selected from the group consisting of hydrogen and methyl; Z' is selected from the group consisting of lower alkyl of from one to twelve carbon atoms, inclusive, and the lower acyl radical of a hydrocarbon carboxylic acid containing from one to twelve carbon atoms, inclusive; M is selected from the group consisting of

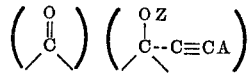

and

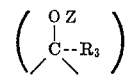

Wherein A is selected from the group consisting of hydrogen, lower alkyl of from one to twelve carbon atoms, inclusive, chlorine, bromine and trifluoromethyl, $R_3$ is selected from the group consisting of hydrogen, lower alkyl of from one to twelve carbon atoms, inclusive, and Z is selected from the group consisting of hydrogen and the lower acyl radical of a hydrocarbon carboxylic acid containing from one to twelve carbon atoms, inclusive.

12. A compound of the formula

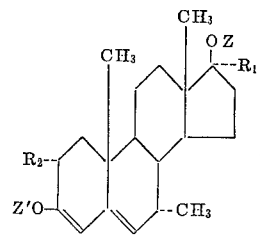

wherein $R_1$ and $R_2$ are selected from the group consisting of hydrogen and methyl; Z is seelcted from the group consisting of hydrogen and acetyl and Z' is acetyl.

13. A compound of the formula

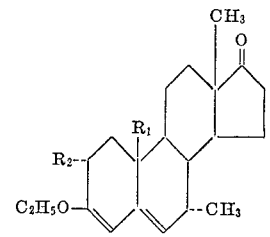

wherein $R_1$ and $R_2$ are selected from the group consisting of hydrogen and methyl.

14. A compound of the formula

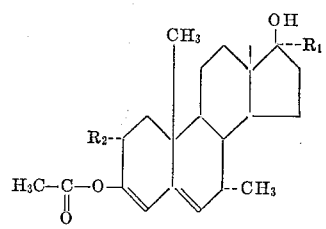

wherein $R_1$ is selected from the group consisting of ethyl and n-propyl and $R_2$ is selected from the group consisting of hydrogen and methyl.

References Cited

UNITED STATES PATENTS

| | | | |
|---|---|---|---|
| 3,194,803 | 1/1965 | Cotton | 260—239.57 |
| 3,197,490 | 7/1965 | Nakanishi | 260—397.3 |

OTHER REFERENCES

Villotti et al.: Jour. Amer. Chem. Soc., vol. 81 (1959), p. 4566.

Nussbaum et al.: Journal Org. Chem., vol. 26 (1961), p. 3925.

Nes et al.: Tetrahedron (1963), vol. 19, pp. 299 to 307.

Steroid Drugs, vol. 11 (Applezweig), 1964, p. 119.

ELBERT L. ROBERTS, *Primary Examiner*.